United States Patent

Ziegler

[15] 3,675,308
[45] July 11, 1972

[54] METHOD FOR ASSEMBLING HYDRAULIC ACCUMULATORS

[72] Inventor: Helmut Ziegler, Muhlheim, Germany
[73] Assignee: ITT Industries, Inc., New York, N.Y.
[22] Filed: July 9, 1970
[21] Appl. No.: 53,339

[30] Foreign Application Priority Data

July 12, 1969 Germany .................. P 19 35 493.9

[52] U.S. Cl. .................. 29/422, 29/434, 29/454, 29/511
[51] Int. Cl. .................. B23p 19/04, B23p 17/04, B23p 11/00
[58] Field of Search .................. 29/422, 434, 454, 511

[56] References Cited

UNITED STATES PATENTS

| 3,123,903 | 3/1964 | Flanagan | 29/454 X |
| 3,512,243 | 5/1970 | Suzuki | 29/434 |
| 3,509,916 | 5/1970 | Mercier | 29/5 N X |
| 3,541,833 | 11/1970 | Mercier | 29/422 X |

FOREIGN PATENTS OR APPLICATIONS

| 670,264 | 9/1963 | Canada | 29/454 |
| 909,110 | 10/1962 | Great Britain | 29/454 |

Primary Examiner—Wayne A. Morse, Jr.
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A method of assembling hydraulic accumulators of the bladder type having a casing formed from two open-mounted shells rigidly fitted together comprising the steps of fitting the bladder on the mouth of the inner shell, sliding the bladder and inner shell into the outer shell until the bladder fits closely against the inner surface of the outer shell, and rigidly connecting the shells in this position.

1 Claim, 1 Drawing Figure

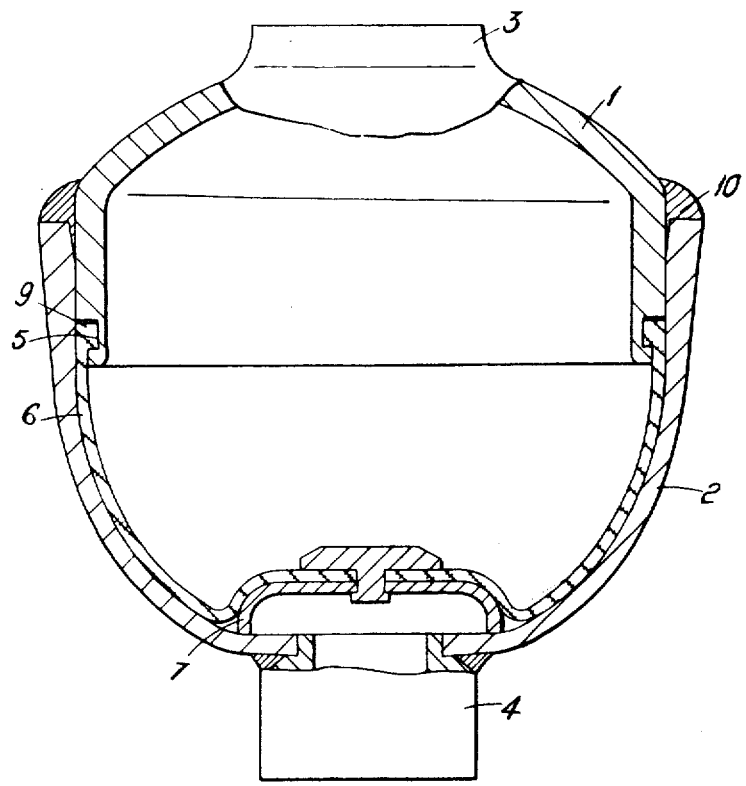

METHOD FOR ASSEMBLING HYDRAULIC ACCUMULATORS

BACKGROUND OF THE INVENTION

This invention relates to a method of assembling hydraulic accumulators of the bladder type having a casing formed from two open ended pot-shaped shells which are fitted together. A bladder or diaphragm attached to one of the shells divides the casing into two chambers, one of which is charged with a gas to form a spring chamber.

Hydraulic accumulators of this type are well known as shown by German Pat. Nos. 1,198,148, 1,228,873, and British Pat. No. 1,122,092. In the conventional method of assembling this type of hydraulic accumulator the smaller shell which has a groove in its outer perimeter for mounting the bladder is inserted into the outer shell withOut any direct means of assuring that in the assembled position the bottom of the membrane or bladder rests on the inside end of the outer shell. If the membrane or bladder is too short it will be stretched by the compressed gas to fill the shell when the accumulator is empty. On the other hand if the membrane is too long it will become bunched up and creased. In any event the life of the membrane is considerably reduced. To manufacture the parts so as to insure a good fit is extremely expensive and greatly increases the cost of the accumulator.

SUMMARY OF THE INVENTION

It is an object of this invention to provide a simple, less expensive method of assembling hydraulic accumulators of the bladder type which insures that the bladder will fit closely along the casing wall without being stretched or pinched when the accumulator is empty.

This object is achieved by fitting the membrane to the inner shell, inserting the inner shell into the mouth of the outer shell until the bladder bottoms against the inside end of the outer shell and rigidly connecting the inner and outer shells together to maintain the position of the bladder within the outer shell.

BRIEF DESCRIPTION OF THE DRAWING

The drawing is a cross-sectional view of an accumulator assembled in accordance with the present invention.

DESCRIPTION OF THE PREFERRED EMBODIMENT

The FIGURE shows a hydraulic accumulator having inner and outer casing parts 1 and 2 welded together to form a unitary casing. The outer diameter of the cylindrical mouth of the inner casing part is equal to the inner diameter of the cylindrical mouth of the outer casing part so that the inner casing part may be inserted into the outer casing part. A connection 3 provides a means for charging the accumulator with gas. A membrane or bladder 6 having an annular bead 9 is held in an annular groove 5 formed in the inner casing part. A stop plate 7 attached to the bottom of the membrane covers the connection 4 and prevents the membrane from being pushed into this opening.

When assembling the accumulator the casing part 1 with the membrane 6 fitted in the groove 5 is pushed into the outer casing part 2 until the membrane stop plate 7 and membrane 6 rest closely against the inner wall of the outer casing. When this occurs the inner casing part 1 is then rigidly connected to the outer casing to seal the accumulator. In the embodiment shown this connection is provided by means of a weld 10 between casing parts 1 and 2.

While I have described above the principles of my invention in connection with specific apparatus it is to be clearly understood that this description is made only by way of example and not as a limitation to the scope of my invention as set forth in the accompanying claim.

I claim as my invention:

1. A method of assembling hydraulic accumulators of the bladder type formed from a casing having a first open-mouthed shell including a first cylindrical portion at the mouth of said first shell having a given outer diameter and a peripheral groove in the outer surface of said first portion adjacent the mouth of said first shell and a second open-mouthed shell including a second cylindrical portion at the mouth of said second shell having a given inner diameter slightly greater than said given outer diameter to provide a force bit between said first and second portions, a connection through said second shell opposite said mouth of said second shell and a bladder includinG an inwardly extending annular bead at one end of said bladder and a cup-shaped stop plate, the bottom of said stop plate being secured to the outer surface of the other end of said bladder comprising the steps of securing the bottom of said stop plate to the outer surface of said other end of said bladder;

fitting said annular bead into said peripheral groove so that said bladder and said stop plate extend outside said first shell;

forcing said bladder, said stop plate and said first shell into said second shell until the mouth of said stop plate contacts the inner surface of said second shell in a bridging relation with said connection to prevent said bladder from entering said connection and until said bladder is in contact with all of said inner surface of said second shell except in the region of said stop plate to prevent damage to said bladder by stretching or pinching thereof when said accumulator is empty; and rigidly connecting said first and second shells together to insure maintenance of the last mentioned position of said bladder with respect to the inner surface of said second shell and said stop plate with respect to said connection.

* * * * *